United States Patent [19]

Pellegrin et al.

[11] 4,319,901

[45] Mar. 16, 1982

[54] ELECTRO-OPTIC FIBER MONITOR

[75] Inventors: Michael T. Pellegrin, Newark, Ohio; Gerhard Kreikebaum; Frederick M. Shofner, both of Knoxville, Tenn.

[73] Assignee: Owens-Corning Fiberglas Corporation, Toledo, Ohio

[21] Appl. No.: 214,822

[22] Filed: Dec. 10, 1980

[51] Int. Cl.³ ........................................... C03B 37/025
[52] U.S. Cl. ........................................ 65/2; 65/10.1; 65/29; 65/160; 242/18 G; 242/42; 356/73.1
[58] Field of Search ..................... 65/10.1, 2, 29, 160; 356/73.1; 242/18 G, 42

[56] References Cited

U.S. PATENT DOCUMENTS

| | | | |
|---|---|---|---|
| 3,471,278 | 10/1969 | Greim | 65/2 |
| 3,879,128 | 4/1975 | Presby | 65/2 X |
| 4,012,661 | 3/1977 | Dudderar et al. | 65/29 X |
| 4,028,827 | 6/1977 | Murphy et al. | 65/29 X |
| 4,046,536 | 9/1977 | Smithgall | 65/2 |
| 4,145,201 | 3/1979 | Phillips | 65/2 |
| 4,146,376 | 3/1979 | Beckman et al. | 65/2 |

Primary Examiner—Robert L. Lindsay, Jr.
Attorney, Agent, or Firm—Ronald C. Hudgens; Patrick P. Pacella; Paul T. Kashimba

[57] ABSTRACT

A method of and apparatus for monitoring the method comprising the steps of: generating electromagnetic radiation; using a first lens to form the electromagnetic radiation into a beam; directing the beam through a sampling volume for impingement upon the fibers; positioning a second lens in the same horizontal plane as the first lens such that the angle, whose tangent is D/d, is greater than or equal to five degrees, where D is the diameter of the second lens and d is the distance from a plane through the center of the second lens to the center of the sampling volume; collecting electromagnetic radiation backscattered from the fibers by means of the second lens; and generating a signal responsive to the amount of radiation collected as an indication of the average diameter of the fibers.

5 Claims, 7 Drawing Figures

ELECTRO-OPTIC FIBER MONITOR

BACKGROUND OF THE INVENTION

This invention relates to the production of continuous glass fibers, e.g., fibers made by melting particulate batch ingredients or minerals, including basalt and the like, and, more particularly, to the monitoring of the average diameter of such fibers.

It is well known in the art that continuous glass fibers can be produced by attenuating a plurality of streams of molten glass into fibers, collecting the fibers into a strand and winding the strand into a package for subsequent use in manufacturing various products. The molten glass flows from a furnace and through a forehearth into a feeder or bushing which has a plurality of orifices formed therein. The molten glass flows from the orifices as streams which are pulled downwardly at a high rate of speed for attenuation into fibers. A plurality of the attenuated fibers are then gathered together into a strand, coated with a sizing and wound onto a collection tube on a winder collet.

The prior art has employed various systems to control the rotational speed of the winder collet in an attempt to maintain a uniform rate of attenuation and hence produce fibers which are closely similar in diameter and which have a uniform diameter throughout their length. The diameter of a package gradually increases as the strand is wound onto the collection tube; therefore, the rotational speed of the collet must be simultaneously decreased in order to maintain a constant rate of attenuation. Roberson, U.S. Pat. No. 3,265,476, discloses varying the winding speed at a programmed or patterned rate so that the pull speed or strand speed is approximately constant. An alternative method of controlling fiber diameter is disclosed in Roberson, U.S. Pat. No. 3,126,268, in which the set point temperature of the bushing is varied at a programmed or patterned rate to compensate for the increasing winding speed as the package is being built.

While such control systems give satisfactory results and represent a marked improvement over the control systems previously known in the art, the fiber monitoring system of Shofner et al., as described in the U.S. patent application of Shofner, Greene and Hanna, Ser. No. 178,269, filed Aug. 15, 1980 can produce even more uniform fibers. Such fiber monitoring system utilizes: a source of electromagnetic radiation, such as a light-emitting diode; beam forming optics to form the electromagnetic radiation into a beam for impingement upon the fibers of interest; collection optics for collecting the radiation scattered by the fibers and for focusing such radiation on a detector to generate a signal indicative of the average fiber diameter. This signal may then be used to modify one or more of the process variables, such as winding speed, to produce fibers of a predetermined average fiber diameter. However, it has been found that a signal of the same magnitude may be generated for several different average fiber diameters, thus resulting in a non-monotonic response.

Therefore, it is an object of this invention to provide a method of and apparatus for monitoring a fiber or fibers that produces a monotonic response for collected, backscattered radiation versus average fiber diameter.

SUMMARY OF THE INVENTION

In accordance with the present invention, there is provided a method of monitoring the average diameter of a plurality of glass fibers, such method comprising the steps of: generating electromagnetic radiation; using a first lens to form the electromagnetic radiation into a beam; directing the beam through a sampling volume for impingement upon the fibers; positioning a second lens in the same horizontal plane as the first lens such that the angle, whose tangent is D/d is greater than or equal to five degrees, where D is the diameter of the second lens and d is the distance from a plane through the center of the second lens to the center of the sampling volume; collecting electromagnetic radiation backscattered from the fibers by means of the second lens; and generating a signal responsive to the amount of radiation collected as an indication of the average diameter of the fibers.

In addition, the invention provides a glass fiber producing apparatus comprising: a feeder for holding a molten body of thermoplastic material, such feeder having an orificed wall for emitting a plurality of streams of the material; a rotary collector for attenuating the streams into continuous fibers and for winding the fibers into a package; a gathering device located between the feeder and the collector for gathering the fibers into a strand before being wound into the package; a source of electromagnetic radiation; a first lens for directing a beam of radiation through a sampling volume for impingement upon the fibers; a second lens positioned in the same horizontal plane as the first lens for collecting electromagnetic radiation backscattered from the fibers, the size and position of the second lens being defined by the equation arc tangent $D/d \geq 5°$, where D is the diameter of the second lens and d is the distance from a plane through the center of the second lens to the center of the sampling volume; and means responsive to the amount of collected radiation for generating a signal indicative of the average fiber diameter. In the preferred embodiment, the orificed wall is rectangularly shaped and the first lens directs the beam of electromagnetic radiation along a diagonal of the orificed wall.

A plot of the backscattered signal versus filament diameter has been found to depend very strongly upon two geometrical factors: (a) the extent of the angular range over which the light is collected for each filament, which is dependent upon lens diameter and the distance from the lens to the filaments; and (b) the orientation of the collector optics relative to the line of illumination. Accordingly, the present invention collects a large amount of light backscattered from the illuminated fibers, since this tends to minimize the effects of the "peaks and valleys" to produce a more monotonic response which enables the measurement to be used for control purposes. Based upon these discoveries, the system of the present invention provides a highly accurate method and apparatus for measuring fiber diameters and for controlling the production of such fibers, thereby insuring that individual fibers have a uniform diameter throughout their length and that the fibers are closely similar in diameter.

For forming fans with a large taper, the tilt of each filament relative to the illumination and collection optics determines the amount of light reaching the detector. There is only a small permissible angular range in which any one filament can be tilted without materially affecting the amount of backscattered light reaching the detector. By orienting the collector optics relative to the filament tilt, in accordance with the teachings of the present invention, a large amount of backscattered light is collected thereby increasing the accuracy of the measurement, thus producing a monotonic response curve and enabling its use for control purposes.

In addition, the system is well adapted to the fiber forming environment which includes large radiative heat loads from the orificed wall, moisture from prepad sprays and periodic cleaning, binder solids entrained in air circulating around the feeder or bushing, shock-vibration loads due to bushing changes, and similar adverse environmental factors. Moreover, the system does not interfere with normal bushing operation and operator access to the bushing.

In a preferred embodiment, a calibration element is combined with an electro-optical measurement instrument to provide a system having automatic compensation of the entire electro-optical train without interruption of the measurement process for monitoring the average diameter of fibers produced in a fiber forming process. The electro-optical instrument includes a plurality of light-emitting diodes which provide a source of substantially monochromatic electromagnetic radiation and optics for collection and focusing radiation onto a detector. The radiation is directed through a sampling volume where it impinges upon the fibers whose diameters are to be measured by scattering techniques. The calibration element is rotatably positioned in the path of the electromagnetic radiation, optically upstream of the sampling volume, such that the radiation is periodically blocked and sampled.

Other objectives, advantages and applications of the present invention will be made apparent by the following detailed description of the preferred embodiments of the invention.

DETAILED DESCRIPTION OF THE PREFERRED EMBODIMENTS

Figure 1:
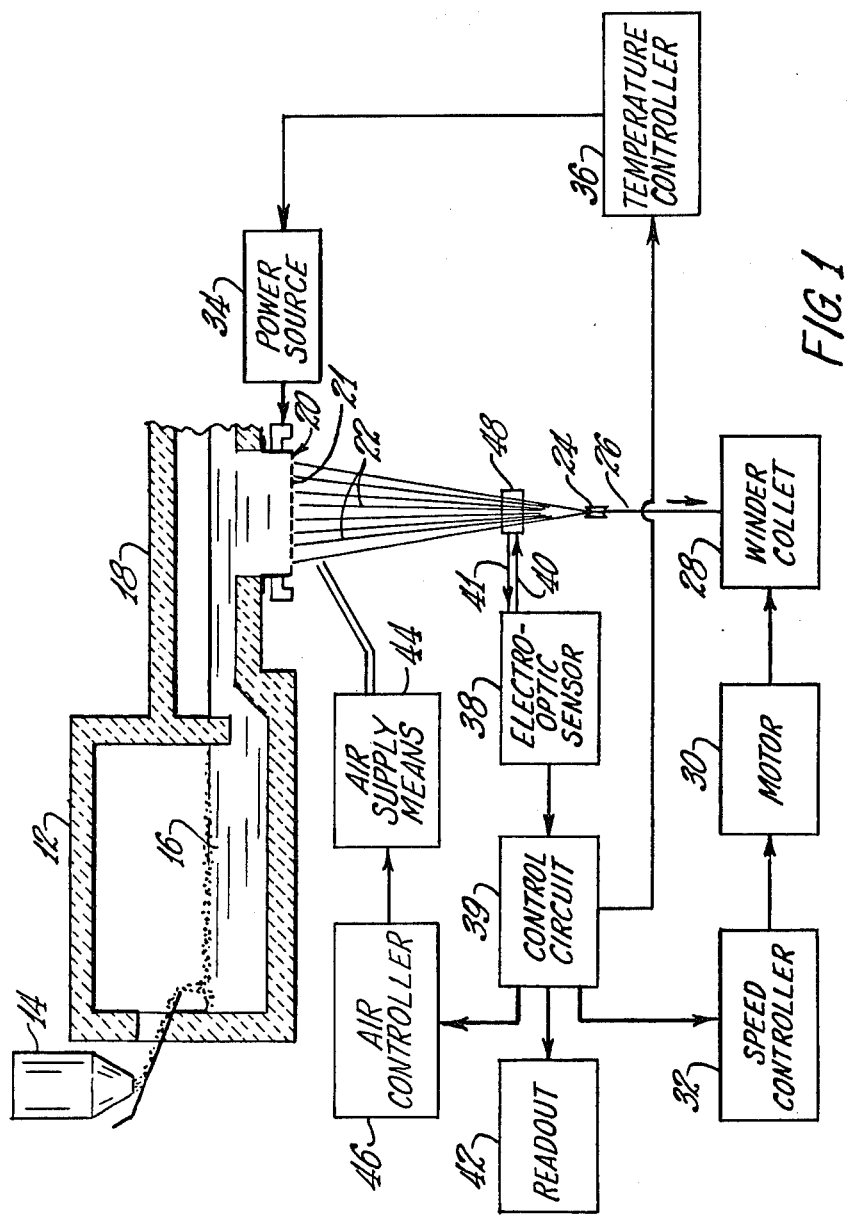
FIG. 1 is a schematic block diagram showing the incorporation of the present invention into an apparatus for producing a plurality of glass fibers or filaments.

FIG. 1 shows the incorporation of the present invention into an apparatus for producing a plurality of glass fibers or filaments. In a typical fiber forming process, raw materials or batch are provided to a melting furnace 12 by suitable supply means 14 at a rate which is sufficient to maintain the mass flow rate of molten glass 16 being extracted and flowed along forehearth 18 to a fiber forming feeder or bushing 20. From bushing 20, molten glass 16 flows into a plurality of streams through a grid of orifices 21 formed in the bottom of bushing 20, such orifices may have projecting tips or may be tipless.

Normally, bushing 20 is electrically heated to control the temperature, thereby controlling the viscosity of the issuing streams of molten glass. The streams of molten glass issuing from orifices 21 are pulled at a high rate of speed for attenuation into individual fibers 22. Attenuated fibers 22 pass downwardly in a generally conical pattern to a gathering member 24 which forms strand 26. Gathering member 24 also may supply a suitable sizing fluid to strand 26 in the known manner, or a separate applicator means may be employed. From gathering member 24, strand 26 moves to a winder collet 28 where it is wound on a collection tube to form a package. Winder collet 28 is driven by a motor 30 or any other suitable means and, generally, the speed of motor 30 is regulated by a speed controller 32.

A temperature controller 36 regulates the amount of electrical energy provided by power source 34 to heat bushing 20, thereby maintaining bushing 20 at a predetermined temperature. The environment beneath bushing 20 is controlled by an air supply means 44 which is positioned beneath bushing 20 for controlling the temperature and airflow, e.g., Thompson, U.S. Pat. No. 4,202,680, which is assigned to the assignee of the present invention. An air controller 46 is connected to air supply means 44 to control the amount of air provided by air supply means 44. Alternatively, the temperature beneath the bushing may be controlled by a finshield arrangement, as disclosed in Russell, U.S. Pat. No. 2,908,036, such arrangement also including a controller for controlling the rate at which the cooling fluid passes through the finshield arrangement. Still further, means may be provided for automatically adjusting the position of the finshields themselves.

Electro-optic sensor 38 is positioned, as described in detail hereinbelow, between bushing 20 and gathering member 24 such that its emitted beam of light 40, falls upon a representative, unsized fiber sample in the electro-optically defined sampling volume 48. Emitted light 40 is backscattered from fibers 22 and a portion thereof, which is indicated generally by numeral 41, is collected by sensor 38. Sensor 38 is connected to a control circuit 39 which, in turn, may be connected to an apparatus 42 for readout, display or storage of the average fiber diameter. For control purposes the output of control circuit 39 is provided to speed controller 32 to vary the winding speed of winder 28, or to temperature controller 36 to vary the temperature of bushing 20, or to air controller 46 to vary the amount of air provided beneath bushing 20, or any combination thereof.

Sampling volume 48 is defined as the joint intersection of the emitted beam of light and the radiation collection optics according to the following equation:

$$I \cdot W = \text{constant}$$

where I is the LED beam intensity in watts/square centimeter and W is the solid angle of reception in steradians. Both I and W are dependent on position relative to the optical system. In essence, sampling volume 48 is that region of space where light from the LED source (numeral 60 in FIGS. 4 and 5) may both fall on fibers 22 and be received by the collection optics (numeral 63 in FIGS. 4 and 5).

Figure 2:
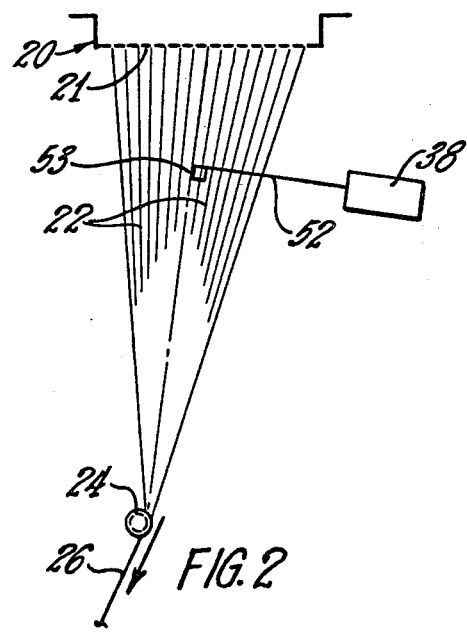
FIG. 2 is a diagrammatic view showing the preferred orientation of the sensor relative to the longitudinal axis of the fibers.

With reference to FIG. 2, the angle between the line of illumination 52 and the fibers of interest 22 should be adjusted so that a maximum amount of light backscattered from preferred fibers will reach the collection optics and be utilized in the diameter measurement. The amount of backscattered light reaching the collection optics is maximized when sensor 38 is tilted on its axis such that emitted light 52 is incident perpendicularly upon the center 53 of the fibers in the preferred part of the fan. Generally, the fibers which are located in the central area of the bushing are preferred, since the fibers located at the periphery are more readily influenced by normal changes in bushing power and changes in the ambient environment.

It has been found that a reasonable compromise between complexity, expense and coverage of the entire bushing is to use a representative sample of the fibers from bushing 20 such that approximately 10% of the fibers are within sampling volume 48. However, this percentage is given by way of example and not in a limiting sense. In addition, it should be noted that the present invention may be utilized to monitor the average diameter of a single fiber.

Figure 3:
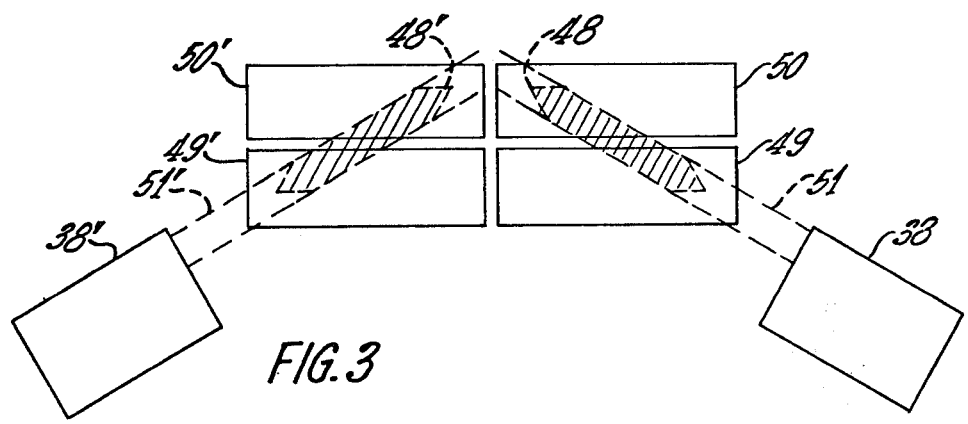
FIG. 3 is a diagrammatic view showing the orientation of two sensors to a single bushing.

FIG. 3 illustrates a typical installation of two electro-optic sensors 38 and 38' on a single bushing where more than one package is wound simultaneously on a single winder, e.g., U.S. Pat. No. 3,897,021. The fiber fan outline approximately 12" below the tip plate of the bushing for the right front quarter of the bushing, as viewed in FIG. 3, is indicated by numeral 49. The fiber fan outline for the right rear quarter of the bushing is indicated by numeral 50. Similarly, for the left side of the bushing the fiber fan outline for the front and rear quarters are indicated by numerals 49' and 50', respectively. Sensor 38 provides a beam of light 51 which illuminates a portion of the fibers in quarters 49 and 50 and defines sampling volume 48. Sensor 38' provides a beam of light 51' to the left half of the bushing, illuminating a portion of the fibers in quarters 49' and 50' and defines sampling volume 48'. The signals from sensors 38 and 38' are provided to control circuit 39 (FIG. 1) for proper correlation and utilization in controlling the fiber forming process, as described in detail below. If desired, more than one sensor 38 may be used for a single bushing even if only a single package is being wound from the fibers supplied by that bushing, thereby monitoring a larger cross section of the fibers in the fan. The individual signals may then be correlated and used to control the fiber forming process as discussed hereinafter. The angular orientation of sensors 38 and 38' along the diagonal of the fiber fan, which is illustrated in FIG. 3, allows the sensors to collect backscattered light from the largest number of fibers, since a minimal amount of shadowing of the fibers occurs in this orientation.

Figure 4:
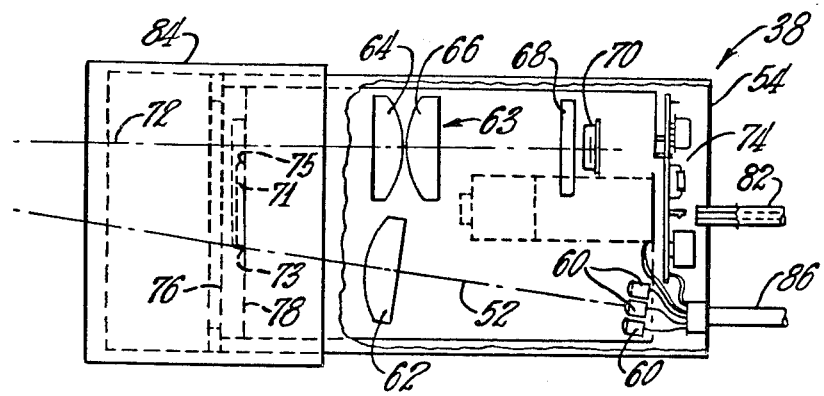
FIG. 4 is a detailed plan view of the sensor of the present invention.
Figure 5:
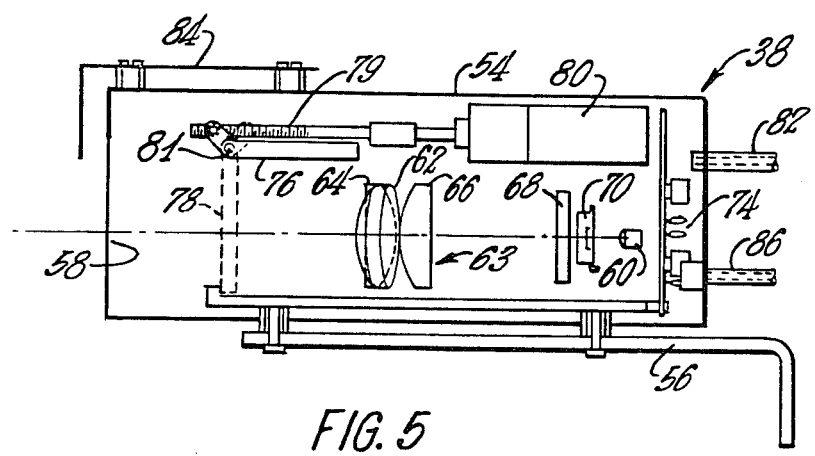
FIG. 5 is a detailed view in elevation of the sensor shown in FIG. 4.

FIGS. 4 and 5 illustrate one embodiment of eletro-optic sensor 38 for use with the present invention from a top view and side view, respectively. Sensor 38 has a housing 54 which is attached by suitable fasteners to mounting plate 56 which, in turn, is mounted in any suitable position adjacent the fiber fan. A quantity of light, indicated by numeral 52, is generated by three light-emitting diodes 60; light 52 from light-emitting diodes 60 is focused into a substantially collimated beam by plano-convex lens 62 after which it exits from housing 54 through aperture 58. Lens 62 is positioned so that its flat side is closest to diodes 60. The collimated beam of monochromatic light may also be generated by a laser or other suitable device. The wavelength of the monochromatic light emitted by diodes 60 may be, for example, 0.9 microns. However, it should be understood that the beam may contain more than one wavelength, in which case, the wavelength or wavelengths of interest would be separated from the collected radiation by conventional filtering techniques.

The light backscattered by the fibers, that is indicated by numeral 72, is passed through collection optics 63 which comprises plano-convex lenses 64 and 66, positioned such that their convex sides are adjacent. Collection optics 63 focuses the backscattered light, after which it passes through an infrared filter 68 onto photodetector 70. The amount of backscattered light received by photodetector 70 is dependent upon the axial response of the system which is related to the focal length of collection optics 63 and the distance of sensor 38 from fibers 22. The output of photodetector 70 is fed to a preamplifier which is part of electrical circuit 74; circuit 74 also contains a driver circuit for diodes 60.

A calibration element 76 is pivotably mounted on pivotal axis 81 such that it can be moved into a closed position indicated by the dotted lines at numeral 78 so that a calibration of the electro-optic portions of sensor 38 can be performed at predetermined intervals. Calibration element 76 is moved into and out of its closed position by screw drive mechanism 79, which is driven by motor/gearhead 80. Calibration element 76 contains fiber optics 71 with ends 73 and 75. The operation of calibration element 76 is discussed hereinafter in detail.

An air hose or coupling 82 supplies air into housing 54 from an air supply (not shown) for blowing dust particles and the like away from the collection or viewing aperture 58 and for cooling electronic circuit 74 to prevent drift. Sensor 38 is also provided with an L-shaped heat shield 84 to protect it from the heat radiated from the tip plate of bushing 20. Heat shield 84 is attached to the top front part of housing 54 by suitable fasteners such that the short leg of L-shaped heat shield 84 is located in front of housing 54 above aperture 58.

Figure 6:
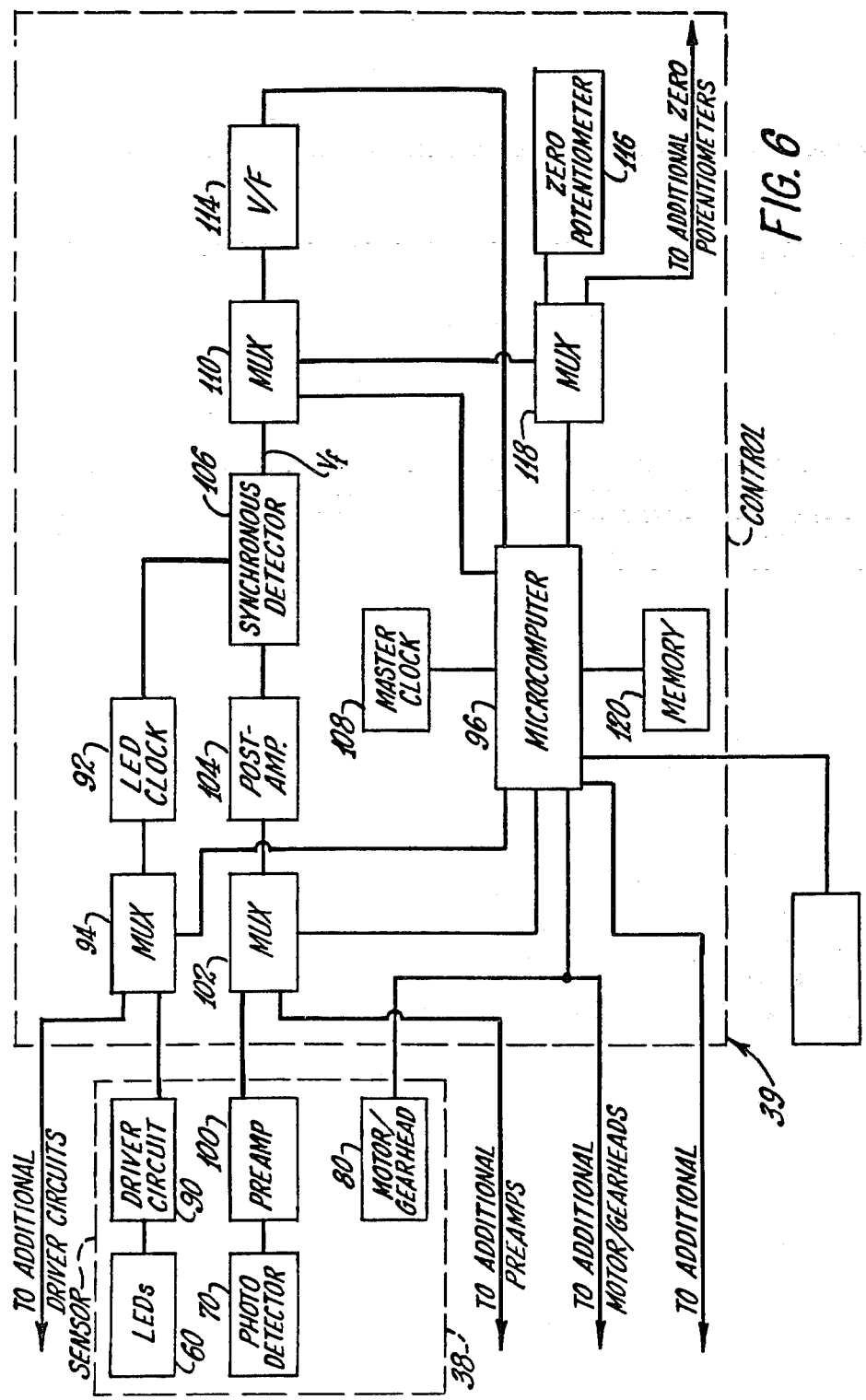
FIG. 6 is a schematic block diagram showing a control system according to the present invention in a microcomputer based system.

With reference to FIG. 6, the signal processing from sensor 38, including how the automatic compensation of gain and zero is implemented by control system 39 in a microcomputer based system, is explained. LEDs 60 are excited by driver circuit 90, which, in turn, is actuated by signals from LED clock 92. The signals from clock 92 reach driver circuit 90 via analog multiplexing switch 94, which is under the control of microcomputer 96. Multiplexing switch 94 may also be connected to other LED driver circuits. Radiation from LEDs 60 is collected by beam forming lens 62, whence it falls upon a representative fiber sample in the electro-optically defined sampling volume 48. Backscattered radiation is received by collection optics 63, passed through infrared filter 68 and focused on photodetector 70. The low level output signal from photodetector 70 is amplified by preamplifier 100 and supplied to multiplexing electronic switch 102 which receives its control signal from microcomputer 96. Multiplexing switch 102 may also be connected to other preamplifiers. Multiplexing switch 102 is connected to postamplifier 104 in which the signal is further amplified and then provided to synchronous detector 106. Clock 92 and synchronous detector 106 are operated in synchronism, as is well known in the art, to permit more reliable signal processing, particularly for low level signals in the presence of high, quasi-static background radiation, such as that found in the vicinity of a luminous bushing.

Synchronous detector 106 filters and applies dc offsets to the signal and provides an output signal, symbolized by $V_f$, to analog multiplexing switch 110 which is under the control of microcomputer 96. Signal $V_f$ is in direct proportion to the mean fiber diameter of the plurality of representative fibers in sampling volume 48. When the output terminal of multiplexing switch 110 is connected to snychronous detector 106, by proper logic from microcomputer 96, $V_f$ is inputted to voltage to frequency converter 114 (V/F converter 114). V/F converter 114 produces an output signal whose frequency is in direct proportion to the analog voltage inputted, this form being optimum for digital processing, as is well known and understood by those skilled in the art.

Signal $V_f$ is compensated for zero and gain variations of the electro-optical system to ensure accurate and reliable results. The variations in the gain of the electro-optical transfer functions can be caused by numerous factors, for example, if the quantity of light produced by the LEDs is reduced by a factor of two, then it follows that the net signal $V_f$ will also be reduced by a factor of two. The gain may also vary if the collection optics are contaminated by foreign matter. For example, if only fifty percent of the light falling upon the collection optics is transmitted, then it follows that the net signal $V_f$ would be reduced by a factor of two. The zero or baseline signal of the system, $V_b$, i.e., the value of $V_f$ when all of the representative fibers in sampling volume 48 are completely removed and no material is inserted in their place, may not reliably approach a true zero voltage but rather some background signal. The origin of $V_b$ may be stray light, ambient light or electromagnetic pickup of any kind.

$V_b$ has been found to be both small and fairly constant and can be made to approach zero by utilizing zero potentiometer 116, which is connected to multiplexing swtich 110 by analog multiplexing switch 118 which is under the control of microcomputer 96. Multiplexing switch 118 may be connected to additional zero potentiometers. If $V_b$ should change, it is a simple matter to adjust zero potentiometer 116 so that $V_f$ approaches zero when the fibers to be measured are removed.

The compensation for electro-optical system gain is accomplished by periodically rotating calibration element 76 downward to its closed position 78. Referring to FIGS. 4 and 6, the mechanical operation of calibration element 76 is accomplished by exciting motor/gearhead 80 which, in turn, operates a screw drive mechanism 79 such that calibration element 76 is operated around pivotable axis 81. Motor/gearhead 80 is driven by a signal provided by microcomputer 96. Microcomputer 96 may also provide actuation signals to additional motor/gearheads.

When calibration element 76 is in its closed position 78, the beam of light from LEDs 60 falls on end 73 of fiber optics 71. A precisely known fraction of the incident radiation then emanates from the other end 75 of fiber optics 71, to collection optics 63. The radiation then passes through filter 68 onto photodetector 70 which generates an electric signal. The signal proceeds along the same signal path as a normal signal from the representative fibers in sampling volume 48. Thus, it is evident that the entire electro-optical transfer function is used so that variations in any component are determined and ultimately compensated.

The mathematical operation of automatic compensation of the transfer function implemented by microcomputer 96, in accordance with a program determined by program and scratch pad memory 120, to produce an automatically-compensated indication proportional to mean fiber diameter can be generally expressed as follows:

$$V_f' = (V_f - V_b)(V_{ref}/V_{cal}) \quad (1)$$

where $V_f'$: final, compensated signal which is proportional to mean fiber diameter;

$V_f$: total signal from representative fibers in sampling volume 48;

$V_b$: signal with no fibers present;

$V_{ref}$: scaling or multiplying signal; and p1 $V_{cal}$: signal with calibration element 76 in closed position 78.

Clearly, the operation of the apparatus of the present invention in implementing equation (1) is to acquire the total signal $V_f$, subtract off the background $V_b$, multiply by a signal $V_{ref}$, and then divide by the calibration $V_{cal}$. $V_b$ is a reference signal derived from control potentiometer 116 to make the readings of sensor 38 agree with separately determined calibration values. Evidently, if the transfer function were reduced by a factor of 50%, then the net signal $V_f$ minus $V_b$ would have been reduced by a factor of 2. However, dividing by the calibration signal $V_{cal}$ results in $V_f'$ indicating the same response to the respresentative fibers in sampling volume 48 as when the transfer function is at its original value.

Microcomputer 96 averages $V_f'$ over time to minimize the effects of any transient aberrations in a fiber or fibers, thereby providing a more meaningful signal, $V_{out}$, for control purposes. By averaging $V_f'$ over time, the average diameter of the plurality of fibers is derived from multiple replications of measurements along the lengths of the fibers.

It has been found that calibration updating of the sensor of approximately once per hour is satisfactory to control the electro-optic transfer function to very precise levels. The initiation of the calibration update is under microcomputer control and in some embodiments takes place at hourly intervals; however, there are other protocols under which the calibration update may be implemented as explained hereinbelow.

Microcomputer 96 provides $V_{out}$ for control of the winder speed. Microcomputer 96 may also provide $V_{out}$ in either analog or digital form to typical panel meters, chart recorders or a plant computer for annunciation, process control and archival storage. These utilizations of the signal $V_{out}$ are well known to those skilled in the art and are served by way of illustration and not limitation.

The multiplexing functions provided by the various multiplexing switches allow microcomputer 96 to process signals from a plurality of sensors at a single bushing, or a plurality of sensors monitoring a plurality of bushings with one or more sensors monitoring each bushing.

Operator access to control of the microcomputer functions is provided through decimal switches 122. Switches 122, in essence, instruct the various subroutines of microcomputer 96 to compute the desired parameter and present it at the desired input/output port. For example, codes may be entered through switches 122 which cause microcomputer 96 to present a signal corresponding to mean fiber diameter at a panel display or, simply by entering another code, the computations may be placed in terms of yardage for a specific bushing design.

Figure 7:
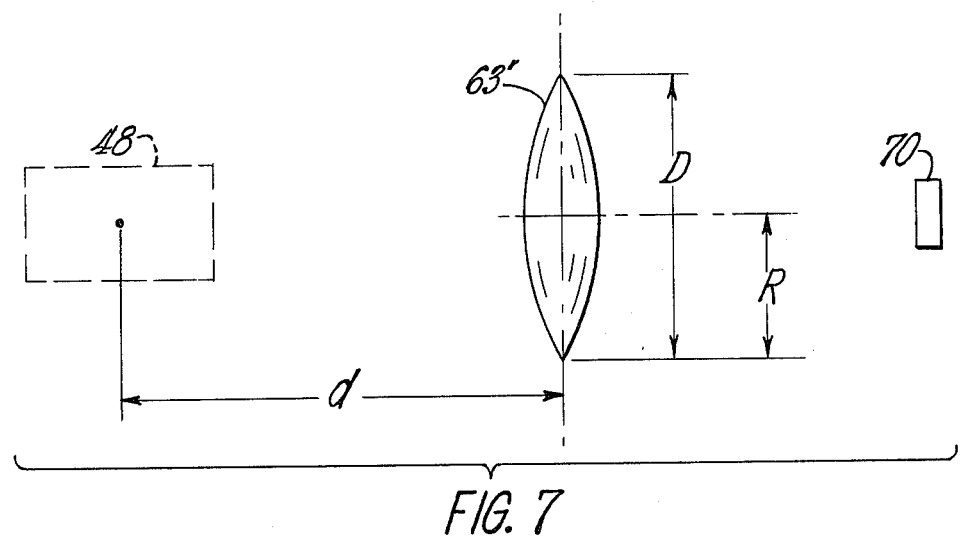
FIG. 7 is a diagrammatic view of the orientation of the collection optics relative to the center of the sampling volume in accordance with the present invention.

The size and orientation of the collection optics relative to the sampling volume is shown diagrammatically in FIG. 7. The lens of collection optics 63' is positioned such that twice the angle, whose tangent is R/d, is greater than or equal to five degrees, where R is the radius of the lens and d is the distance from a plane through the center of the lens to the center of sampling volume 48 (2 arc tan $R/d \geq 5°$). Because of the relatively large distance and hence small angle involved, this formula may be approximated by arc tangent $D/d \geq 5°$, where D is the diameter of the lens and d is the distance as defined above. In addition, the lens or lenses of the collection optics are positioned in the same horizontal plane as the beam forming optics, as shown in FIG. 5. If, for example, the collection optics consists of two lenses, as shown in FIGS. 4 and 5, the distance from the center of the sampling volume to a plane through the center of the first lens (lens 64 in FIGS. 4 and 5) is the proper distance (d). When the present invention is utilized to measure the average diameter of a single fiber, the fiber of interest is moved through the center of the sampling volume.

As described above, numerous factors, such as winder speed control, bushing temperature control, and environmental control beneath the bushing, can be utilized to vary the diameter of the fibers being produced. Winder speed control is employed herein as an example of the incorporation of the electro-optical apparatus of the present invention into a fiber forming process; however, such should not be considered as a limitation since control of any one or combination of the fiber forming factors may be employed with the present invention to obtain fibers of uniform diameter.

Referring again to FIG. 1, the electro-optical system of the present invention is incorporated into a fiber forming process as follows. Sensor 38 emits a beam of light 40 towards fibers 22 in sampling volume 48; the light impinging upon such fibers is backscattered, indicated generally by numeral 41, and a portion thereof is collected and focused on a photodetector in sensor 38. Sensor 38 then provides a signal to control circuit 39 which manipulates the signal as described above and provides a signal indicative of the mean fiber diameter to speed controller 32. Winder collet 28 is directly connected to a variable speed motor 30 whose speed is contolled by speed controller 32. If the mean fiber diameter is too large, sensor 38 produces a signal $V_f$ that is larger than normal; such signal produces an error signal in speed controller 32. Speed controller 32 utilizes the error signal to increase the speed of motor 30 which results in an increased strand speed causing a reduction in the mean fiber diameter, such that ultimately, $V_f$ will exactly match a preset reference value within speed controller 32. The mean fiber diameter is thus controlled by achieving a constant $V_f$. Similarly, if the mean fiber diameter is too small, sensor 38 would produce a $V_f$ that is smaller than normal; such signal produces an error signal in speed controller 32 so that speed controller 32 decreases the speed of motor 30 resulting in a decreased strand speed and hence an increase in the mean fiber diameter.

In a typical fiber forming operation, winder collet 28 is brought up to speed after initiation by an operator or by winder speed controller 32. At this point, control is shifted to control circuit 39 so that after a brief settling transient, glass of constant mean fiber diameter is wound onto the package. When a predetermined amount of time or, better, weight of glass has been wound onto the package, the run is terminated. At this point, while the new collection tube is being brought into position and a new run started, control circuit 39 receives a signal either from an operator, or from speed controller 32, to go through an automatic calibration. When the calibration is finished, control again is given to control circuit 39 for making glass of constant mean fiber diameter. If desired, a protocol may be employed to send the sensor into an automatic calibration, when for any reason the fiber forming process is upset such that yardage of nominal value can no longer be made. This protocol will provide the advantages of protecting the internal elements of sensor 38 during the correction of the problem causing the upset and allowing sensor 38 to utilize downtime for performing the calibration of the transfer function rather than during normal operation.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in the light of the foregoing disclosure.

We claim:

1. A method of monitoring the average diameter of a plurality of glass fibers, said method comprising the steps of: generating electromagnetic radiation; using a first lens to form said electromagnetic radiation into a beam; directing said beam through a sampling volume for impingement upon said fibers; positioning a second lens in the same horizontal plane as said first lens such that the arc tangent $D/d \geq 5°$, where D is the diameter of said second lens and d is the distance from a plane through the center of said second lens to the center of the sampling volume; collecting electromagnetic radiation backscattered from said fibers by means of said second lens; and generating a signal responsive to the amount of radiation collected as an indication of the average diameter of said fibers.

2. A method as recited in claim 1, wherein said plurality of fibers are formed by a rectangularly shaped, orificed wall and said beam directing step comprises directing said beam of electromagnetic radiation along a diagonal of said orificed wall.

3. A method of monitoring the average diameter of a glass fiber, said method comprising the steps of: generating electromagnetic radiation; using a first lens to form said electromagnetic radiation into a beam; directing said beam through a sampling volume; moving a fiber through the center of said sampling volume; positioning a second lens in the same horizontal plane as said first lens such that the arc tangent $D/d \geq 5°$, where D is the diameter of said second lens and d is the distance from a plane through the center of said second lens to the center of the sampling volume; collecting electromagnetic radiation backscattered from said fiber by means of said second lens; and generating a signal responsive to the amount of radiation collected as an indication of the average diameter of said fiber.

4. An apparatus for producing glass fibers, said apparatus comprising: a feeder for holding a molten body of thermoplastic material, such feeder having an orificed wall for emitting a plurality of streams of said material; a rotary collector for attenuating said streams into continuous fibers and for winding said fibers into a package; a gathering device located between the feeder and the collector for gathering said fibers into a strand before being wound into said package; a source of electromagnetic radiation; a first lens for directing a beam of radiation through a sampling volume for impingement upon said fibers; a second lens positioned in the same horizontal plane as said first lens for collecting electromagnetic radiation backscattered from said fibers, the size and position of said second lens being defined by the equation arc tangent $D/d \geqq 5°$, where D is the diameter of said second lens and d is the distance from a plane through the center of said second lens to the center of the sampling volume; and means responsive to the collected radiation for generating a signal indicative of the average fiber diameter.

5. An apparatus as recited in claim 4, wherein said orificed wall is rectangularly shaped and said first lens is positioned such that it directs said beam along a diagonal of said orificed wall.

* * * * *